April 23, 1957 R. H. BROWN 2,789,330
WHEEL BALANCING APPARATUS AND METHOD
Filed Aug. 12, 1955
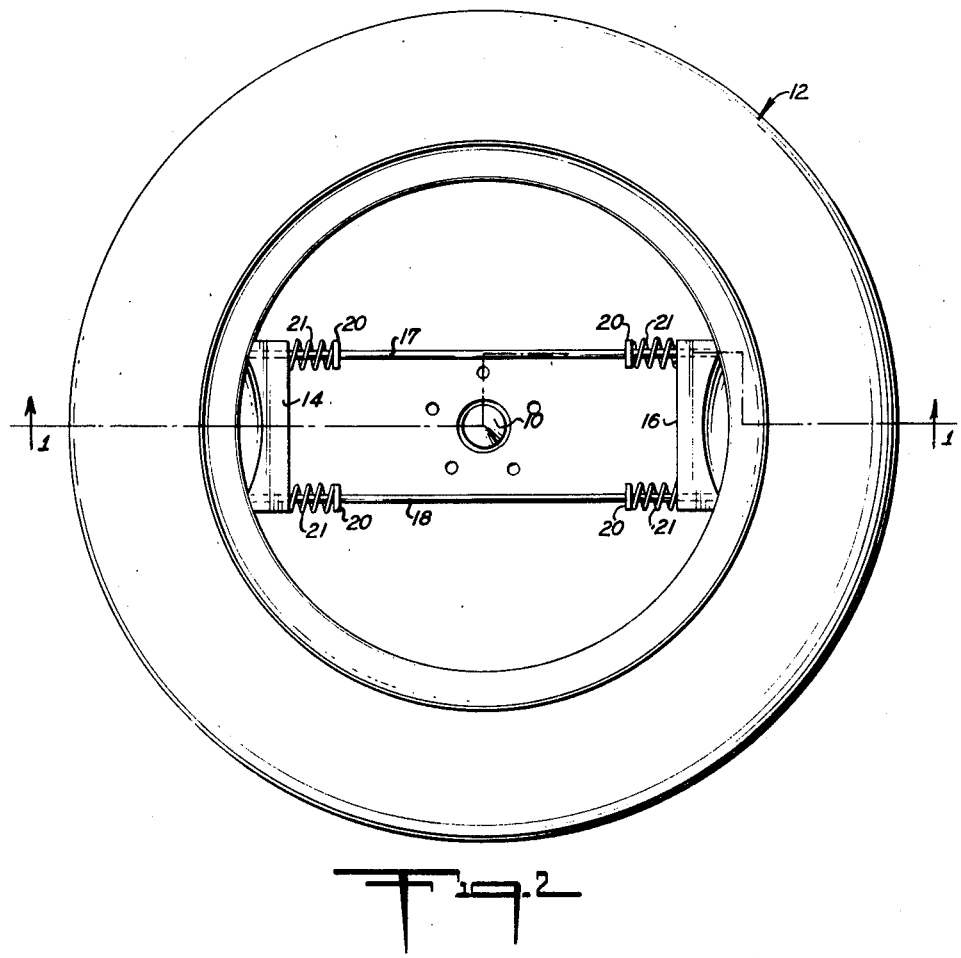
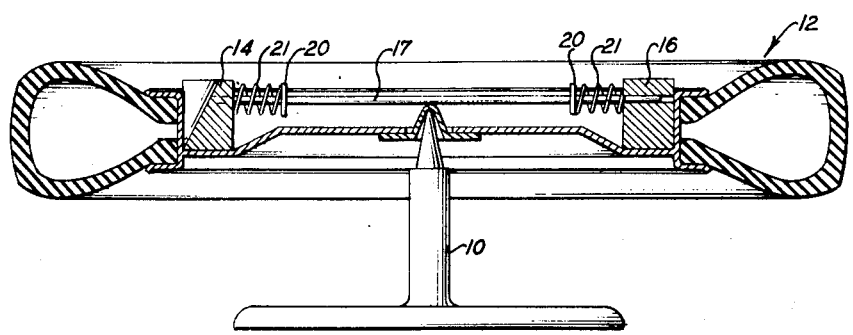
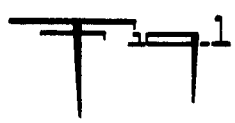
INVENTOR
R. H. BROWN
BY
ATTORNEY

United States Patent Office 2,789,330
Patented Apr. 23, 1957

2,789,330

WHEEL BALANCING APPARATUS AND METHOD

Robert H. Brown, Pulaski, Tenn., assignor of one-half to Robert M. Bowers, Pulaski, Tenn.

Application August 12, 1955, Serial No. 528,221

6 Claims. (Cl. 22—116)

The present invention relates to a method and apparatus for balancing wheels and particularly for balancing automobile wheels.

One object of the present invention is to reduce the time required for wheel balancing. Another object is to apply the weights where they will be out of sight. Another object of the invention is to apply the weights in the plane within the total wheel and tire mass, where the weight will most effectively dampen the vibration caused by dynamic unbalance.

Another object of the invention is to apply the weights where they will not be thrown off by centrifugal force, but will be retained thereby.

Still another object of the invention is to apply the weights, in such a manner, that they will not interfere with hubcap engagement or other decorative features to be applied to an automobile wheel.

In general, the objects of the invention are accomplished by molding molten lead or the like, directly onto the inside of the automobile wheel, as near the lateral center of the rim as possible. This is accomplished by first placing the wheel to be balanced on a suitable balancing device to locate the light side of the wheel. Once this is located, the paint is removed at the spot where the weight is to be added and the wheel is tinned in preparation for application of the weight. A mold is then placed inside the rim, while the wheel is on the balancer and enough molten lead is ladled into the mold to balance the wheel. The molding assembly extends diametrically across the inside of the wheel with at least one mold against the inside of the rim. Each mold has a convex bottom mating with the inside of the rim to form a seal and a concave top forming a molding cup with the inside of the same rim.

One feature of the invention is the use of molten weighing material molded into the inside of wheels in predetermined quantities. Another feature of the invention is the provision of a method and means for molding these weights. The invention will be better understood by reference to the attached drawings in which:

Fig. 1 is a sectional view along lines 2—2 of Fig. 2; and

Fig. 2 is a plan view showing molds of the present invention in position for accomplishing the balancing operation with a wheel on a balancer.

In Fig. 1, a balancer 10 of any standard construction, is shown mounting an automobile wheel and tire, indicated generally at 12. At the stage illustrated, the light side of the wheel has already been determined and the inside of the rim has been prepared for balancing by having the paint removed and the surface tinned with a soldering iron or other suitable means. A pair of balanced molds 14 and 16 of identical weight are mounted on a frame which comprises two cross bars 17 and 18 extending diametrically across the wheel 12. It will be seen, that each mold has a tapered shape extending between a convex bottom and a concave top fitting against the inside of an automobile wheel rim and forming a molding cup therewith. One mold cup thus formed, is on the light side of the wheel and the other is on the heavy side. These molds are constructed of any suitable refractory material which is non-adhesive with respect to molten lead or to other balancing material being used. With the molds thus positioned, and the wheel on the balancer, it will be seen, that the equal weight of the molds avoids interference with the wheel balancing operation. At this stage, molten lead is poured directly into the mold on the light side, until the wheel is balanced. If the operator is unskilled, and too much lead is poured into the mold on the light side, he may simply ladle molten lead into the other mold on what was formerly the heavy side to balance the wheel while it is still on the balancer. The level bubble will tell when the wheel is balanced. The lead will set almost immediately and the molds can be removed forthwith.

Thus, it will be seen, that the lead is deposited inside the wheel, out of sight, where centrifugal force will tend to tighten rather than loosen it. Using molten lead will enable one to salvage scraps and reuse old balancing materials. The entire operation is simple, efficient, effective and inexpensive. It also places the lead in the lateral center of the wheel and tire for better dynamic balance.

The procedure outlined above, is the preferred one, but alternative methods of balancing may be used. According to one of these methods, ladles of exactly the same weight are placed at the same position on opposite sides of the wheel with one ladle positioned at the light side. Lead scraps are then added to the light-side ladle until the wheel is in balance and then, these scraps are melted in the ladle after which they are molded directly onto the light side of the rim, as in the preferred method. This technique has the advantage of predetermining the quantity of lead to be melted. If one wishes to balance all five wheels of a vehicle at one time, each wheel can be placed on the balancer and the proper amount of lead can be put in a ladle which can then be heated while other wheels are on the balancer for measuring the required amount of lead. By this technique, the lead for wheel No. 1 will be melted in a first ladle by the time that the ladle for wheel No. 5 receives its measured quantity of lead. This makes an efficient operation in which measured quantities of lead are determined for each wheel in one step, the lead is melted in a second step and the molten lead is molded in the third step.

In still another alternative method, particularly useful with tubeless tires, the lead particles may be dropped directly into the light-side mold of a pair of weight balanced molds and this mold may then be heated with a blow torch or the like to melt the lead for molding in place.

While the above described methods and apparatus for balancing a wheel are entirely adequate and accomplish the desired result, the method and apparatus may be somewhat simplified by providing a supply of lead slugs, or pellets of different weights which may be obtained if desired, by melting down balancing weights removed from wheels and pouring the same into individual molds to provide slugs or pellets of the desired weight.

The wheel to be balanced is mounted on the balancing apparatus and slugs or pellets placed on the rim at the proper location until the wheel is in exact balance. The location at which weight is to be added is marked and the wheel removed from the balancing apparatus. Paint, rust and other foreign matter is removed from the rim at such location and the area tinned.

The slugs or pellets found necessary to balance the wheel are melted and a single mold of the proper contour to fit the inner side of the wheel rim is held in place at the tinned area, by the hand of the operator.

The molten lead is then poured into the mold where it sets almost immediately and the mold is removed leaving the lead firmly bonded to the wheel rim.

One wheel or any number of wheels may be conveniently and rapidly balanced by following the procedure described above and if desired, the weights necessary for a number of wheels may be determined and then melted in individual ladles to be cast in place on the wheels in rapid succession.

An important feature in this invention is the mold assembly construction which cooperates with the inside of the rim of an automobile wheel to form hollow molds. The molding side of the individual molds are convex at their bottoms for mating with the concave inside of a rim to form a liquid-tight seal and the top of the molding sides of the same mold are concave to provide one side of a mold cup which is tapered from its concave top to its convex bottom. In the preferred form of the invention, one of these molds is mounted on each side of the wheel to be balanced, so that the two molds counterbalance one another, but, obviously, in the alternative procedure which uses ladle balancing, it is entirely possible to use a single mold positioned on the light side of the wheel.

In the mold construction illustrated, a frame is formed by two rods 17 and 18 having a length just less than the diameters of the wheels to which the molds are to be applied. Each end of each rod extends into a hole, not shown, in one of the molds 14 or 16 and each rod is provided with a stop collar 20 at each end thereof, with a compression spring 21 extending between the collar and the mold for forcing the molds into operative engagement with the inside of the rim.

The individual hand held mold for use as described above may be substantially the same as the mold 14, but with the rods 17 and 18 and the springs 21 omitted.

Thus it will be seen, that the present invention provides an entirely new concept in wheel balancing characterized by the use of molten lead, a unique mold construction, a novel position for the balance weights on the rim of the wheel, new techniques for determining the quantities of weight to be used, and a new concept in the method of applying the weight.

Minor modifications will be obvious to those skilled in the art without departing from the scope of the invention.

What is claimed is:

1. A molding assembly adapted to be used in balancing rimmed automobile wheels comprising a frame, a mold at each end of the frame, the face of each of said molds having a convex bottom and a concave top, with the convex portion being adapted to engage the inside rim of an automobile wheel in a substantially liquid-tight seal and said molds being resiliently mounted on said frame whereby they will adjust themselves to the contours of said rim.

2. A molding assembly for use in balancing automobile wheels which comprises a unitary mold body and face having at its face, a convex bottom adapted to form a seal with the inside of an automobile wheel rim and a concave top adapted to form a mold cup with said rim and mounting means adapted to engage the body of said mold at one end and the diametrically opposed side of the wheel at the other.

3. The method of balancing automobile wheels which comprises placing said wheel on a leveling device, determining the light side of the wheel, placing a mold against the inside of the rim of said wheel at the light side thereof and molding molten weighing material in said mold, the quantity of molten material being regulated with the wheel in place on said leveling device.

4. The method, as set forth in claim 3, wherein said regulation is accomplished by placing a second mold of the same weight as the first named mold against the inside of the rim of said wheel at the heavy side thereof and pouring said molten material in the light side mold until the leveling device indicates that the wheel is in balance.

5. The method as set forth in claim 3, wherein said regulation is accomplished by placing a second mold of the same weight as the first named mold against the inside of the rim of said wheel at the heavy side thereof, placing solid weighing material in the light side mold until the leveling device indicates that the wheel is in balance and thereafter melting the weighing material in the mold.

6. The method as set forth in claim 3 wherein said regulation is accomplished by placing containers of equal weight on the light and heavy sides of the wheel and weighing material is placed in the container on the light side until the leveling device indicates that the wheel is in balance and thereafter transferring the weight material to said mold in molten form.

References Cited in the file of this patent

UNITED STATES PATENTS

| | | |
|---|---|---|
| 1,233,485 | Leblanc | July 17, 1917 |
| 1,842,141 | Batie | Jan. 19, 1932 |
| 1,901,280 | Barnholdt | Mar. 14, 1933 |
| 2,029,561 | Du Sang | Feb. 4, 1936 |
| 2,193,734 | MacCracken | Mar. 12, 1940 |
| 2,313,339 | Hare | Mar. 9, 1943 |